(12) United States Patent
Weets et al.

(10) Patent No.: US 6,439,667 B1
(45) Date of Patent: Aug. 27, 2002

(54) CONTAINER DUMPING APPARATUS

(76) Inventors: Aaron J. Weets, 4651 N. County Line Rd., Grandview, WA (US) 98930;
Dennis C. Weets, 4651 N. County Line Rd., Grandview, WA (US) 98930

( * ) Notice: Subject to any disclaimer, the term of this patent is extended or adjusted under 35 U.S.C. 154(b) by 0 days.

(21) Appl. No.: 09/714,679

(22) Filed: Nov. 15, 2000

(51) Int. Cl.$^7$ .................................................. B60P 1/34
(52) U.S. Cl. ..................................... 298/11; 298/22 P
(58) Field of Search .................. 298/11, 22 P; 414/406, 414/408, 419, 420

(56) References Cited

U.S. PATENT DOCUMENTS

| | | |
|---|---|---|
| 3,984,017 A | 10/1976 | Giles |
| 4,029,357 A * | 6/1977 | Bishop .......................... 298/11 |
| 4,066,178 A | 1/1978 | Carson |
| 4,573,742 A * | 3/1986 | Tegtmeier ...................... 298/11 |
| 4,580,940 A | 4/1986 | Sheaues |
| 4,989,917 A * | 2/1991 | Schmidt, Jr. ................... 298/11 |
| 5,193,882 A * | 3/1993 | Gamaldi ........................ 298/11 |
| 5,294,137 A | 3/1994 | Barber et al. |
| 5,299,856 A * | 4/1994 | Grosz ............................ 298/11 |
| 5,725,348 A | 3/1998 | Drake |
| 5,769,592 A | 6/1998 | Christenson |
| 5,833,429 A | 11/1998 | McNeilus et al. |
| 5,890,865 A | 4/1999 | Smith et al. |
| 5,967,731 A | 10/1999 | Brandt |

* cited by examiner

Primary Examiner—Stephen T. Gordon
(74) Attorney, Agent, or Firm—Liebler, Ivey & Connor; Floyd E. Ivey

(57) ABSTRACT

This invention relates generally to automated dumping or emptying of filled containers and specifically to the dumping of harvested fruit contained within a gondola with the apparatus of this invention automating the emptying of a fruit filled gondola into a truck or other receiving container or structure. The invention is the movement of the gondola from an upright position to a position displaced from the vertical which is away from the apparatus of the invention and toward a container into which the gondola contents are to be dumped. A lifting and tipping support frame pivotally receives the gondola. The lifting and tipping support frame is composed in part by lifting arms which are interconnected with stabilizing arms of differing lengths with the upper or top stabilizing arm longer than the lower or bottom stabilizing arm. A stationary post is welded to a container dumping frame. The top and bottom stabilizing arms are pivotally affixed by journals at the lifting arm and at the stationary post. The distance between journals at the stationary post is greater than the distance at the lifting arm, The difference in lengths of the stabilizing arms and the difference in distance between journals causes the lifting arm, when the assembly is raised by lifting, to tip away from the vertical and Out and away from the container dumping frame. At the maximum height of the lift the container or gondola is rotated about the top of the lifting arm into a position allowing the gondola contents to be discharged.

19 Claims, 6 Drawing Sheets

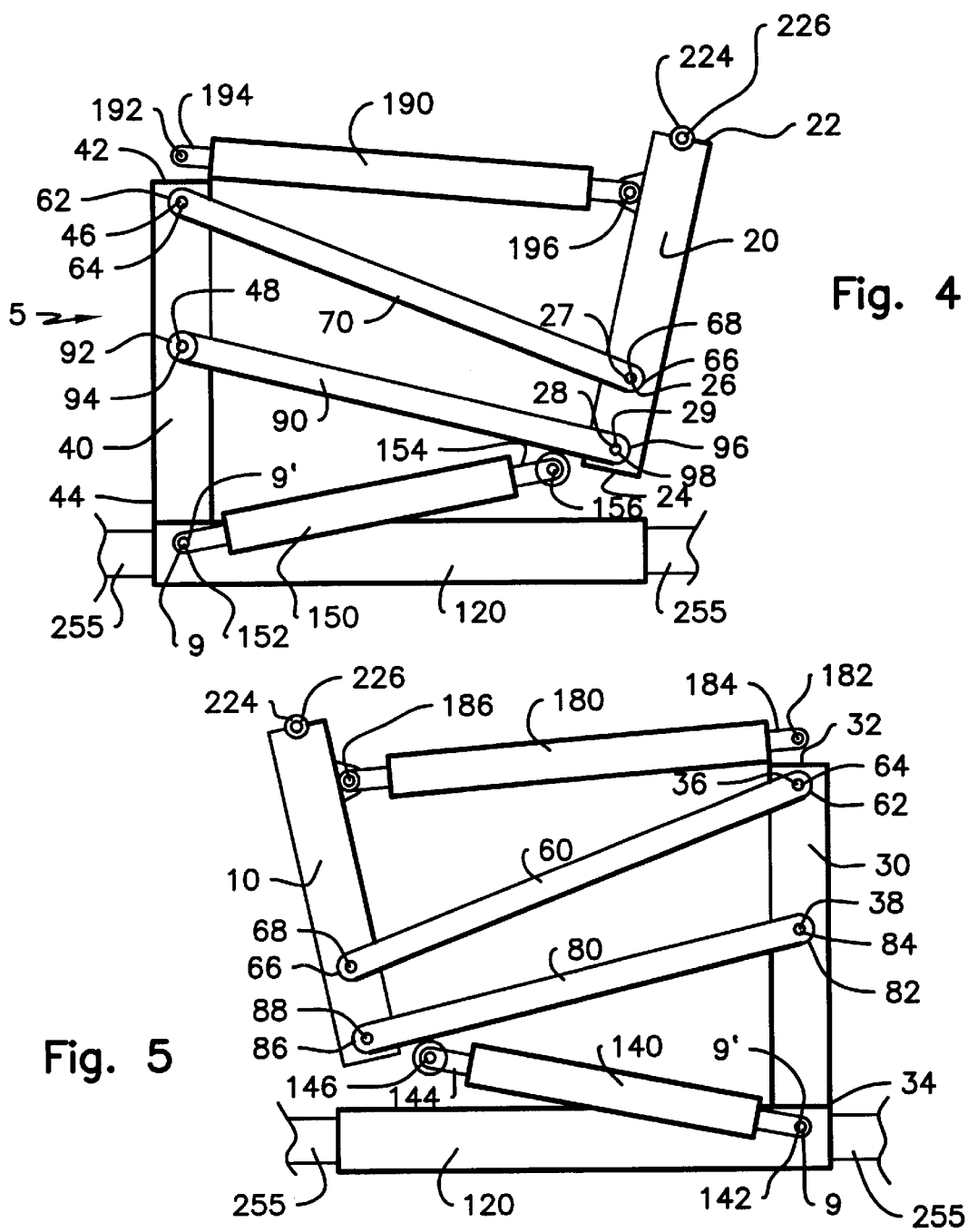

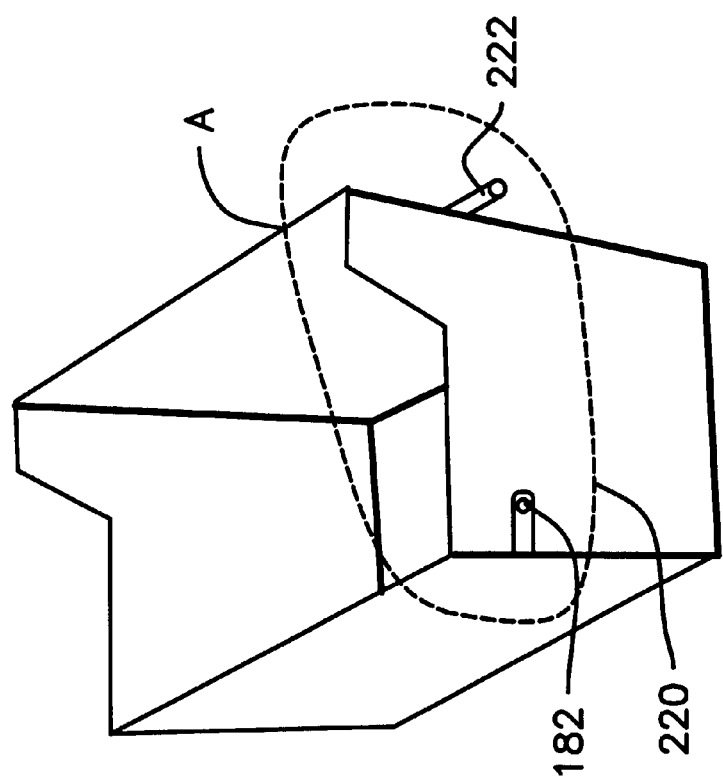
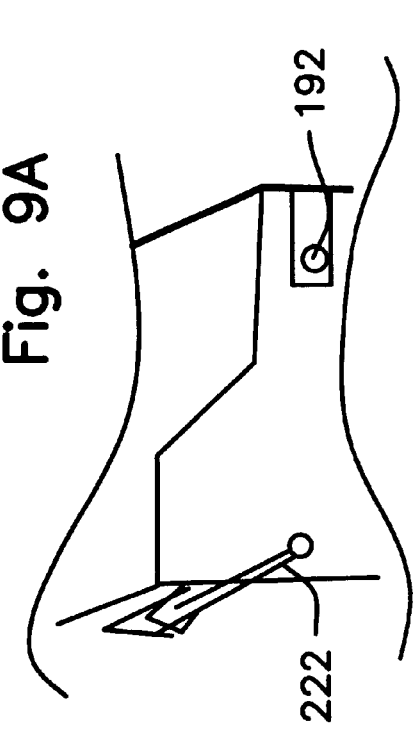
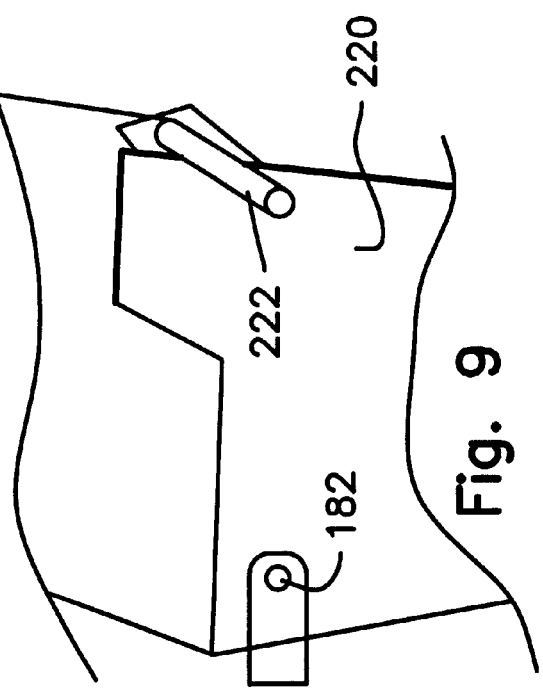

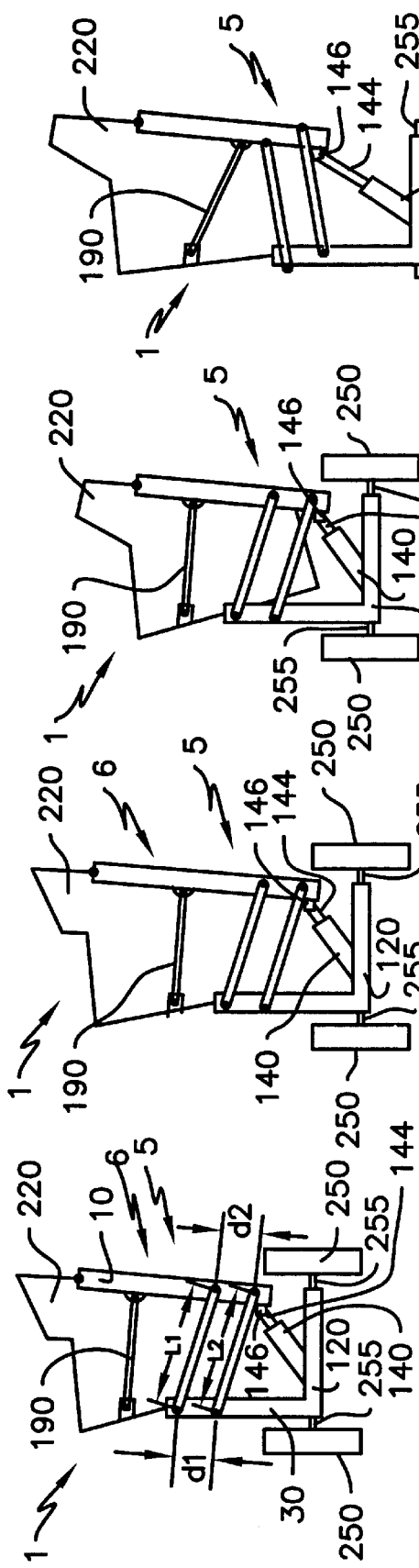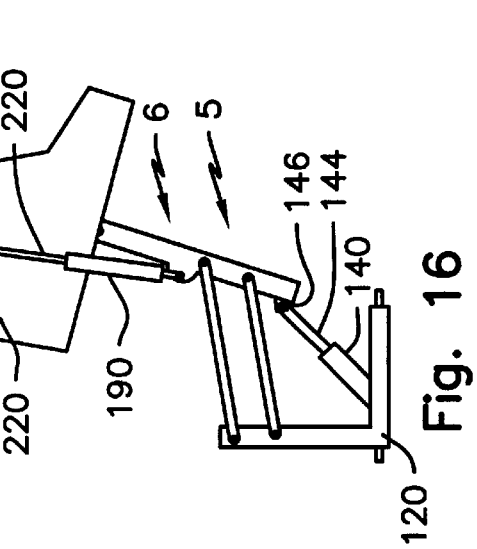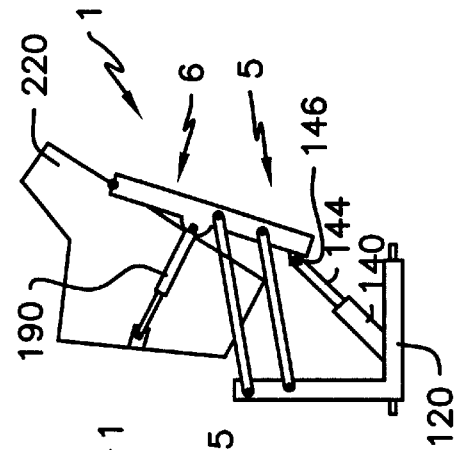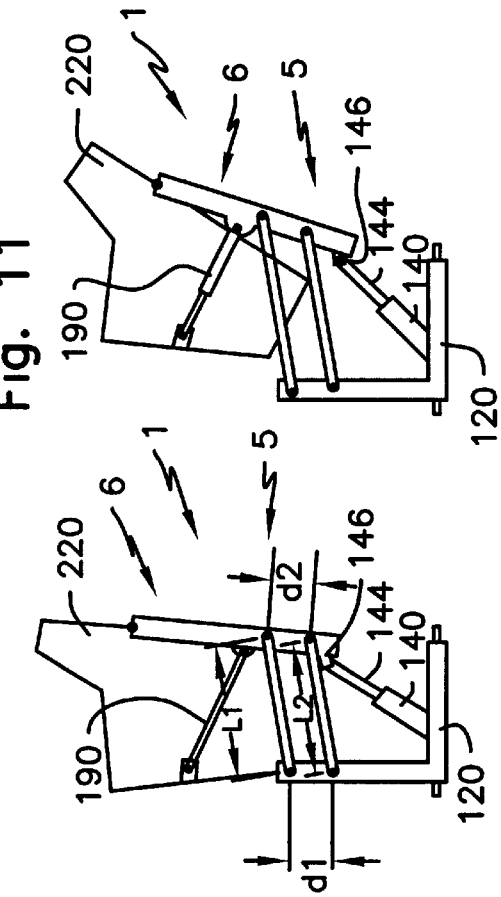

CONTAINER DUMPING APPARATUS

FIELD OF THE INVENTION

This invention relates generally to automated dumping or emptying of filled containers and specifically to the dumping of harvested fruit contained within a gondola with the apparatus of this invention automating the emptying of a fruit filled gondola into a truck or other receiving container or structure.

BACKGROUND OF THE INVENTION

Grape harvesting is commonly accomplished by harvesting equipment unloading grapes into gondolas which act as intermediate carriage between harvesting equipment and truck trailers utilized for transporting from vineyard to processing plant. Presently utilized devices raise the gondola to a level where the contents may be discharged into the trailer. The trailers used at present are approximately nine feet from ground to trailer top. Present art holds the gondola in a frame and lifts the gondola by hydraulically driven telescoping pipe segments. Such a telescoping apparatus experiences frequent binding events thus disrupting the ease of lifting; the telescoping apparatus requires frequent lubrication with hazard of contamination of grapes by the transfer of lubricant from the apparatus to grapes. U.S. Pat. No. 3,984,017 to Giles discloses a self-emptying container. U.S. Pat. No. 4,580,940 to Sheaves demonstrates a refuse container lift/dump apparatus. U.S. Pat. No. 5,294,137 to Barber et al. Shows a transport container with integral dolly. U.S. Pat. No. 5,725,348 to Drake discloses a dumpster and vehicle mounted lifting arm therefor. U.S. Pat. No. 5,769,592 to Christenson discloses a container grabbing device. U.S. Pat. No. 5,833,429 to McNeilus et al., shows a swivel mounted container handling system. U.S. Pat. No. 5,890,865 to Smith et al., shows an automated low profile refuse vehicle. U.S. Pat. No. 5,967,731 to Brandt discloses an auto cycle swivel mounted container handling system. U.S. Pat. 4,066,178 to Carson discloses a container dumping apparatus. The patents referred to herein are provided herewith in an Information Disclosure Statement in accordance with 37 CFR 1.97.

SUMMARY OF THE INVENTION

The Container Dumping Apparatus invention illustrated herein is an apparatus for the lifting and progressive tipping of a container whose contents are to be discharged or dumped into another container. A frame means receives a container, depicted in the drawings as a gondola familiar to those in grape harvesting, with the frame means comprised in part by a frame, identified herein as a lifting and tipping support frame 6, having container pivotally connecting or affixing means, provided in the preferred embodiment of journal means, for pivotal securing of the gondola to the frame means. Additional frame means 120 supports the invention and, in the preferred embodiment, receives axle and wheel means for ease of transport of the invention with gondola.

The invention is the raising and positioning of the container, or gondola, to an orientation suitable for the discharge of the container contents into another container, generally a truck. The sequence of actions demonstrating the invention is the movement of the container, from generally an upright position wherein a portion of the container may be proximal wheel means, first to a raised position which raises the container or gondola so that all parts of the container will clear the wheel means and second to a farther raised position accompanied by the progressive tipping of the frame means or lifting and tipping support frame 6, with the pivotally affixed container, out from and away from the starting generally upright position.

When the container has been moved or raised to a maximum height and tipped to its fullest extent, the container is pivoted about the container affixing means, at the lifting and tipping support frame 6, such that the contents of the container will be discharged. Lifting means for the raising of the lifting and tipping support frame 6 and pivoting means for the rotation of the container is provided, in the preferred embodiment by hydraulic actuators. Other lifting and pivoting means will be recognized by those of ordinary skill in mechanical arts to include but not be limited to pneumatic actuators and a variety of gear and motor means.

The principal disclosure of this invention is the progressive raising and tipping, out and away from the starting generally upright position, of the container. This is accomplished by fixing the frame means, seen in the preferred embodiment as the lifting and tipping support frame 6, to top and bottom stabilizing arms, of differing lengths, which are pivotally fixed to stationary posts at top and bottom stabilizing arm first ends and which are pivotally fixed to lifting arms at top and bottom stabilizing arm second ends. As seen in the drawings, the lifting arms comprise a portion of the lifting and tipping support frame 6. The distance between pivots, for stabilizing arms, at the stationary posts differs from the distance between pivots, for stabilizing arms at the lifting arms. In the preferred embodiment the length of the top stabilizing arm is greater than the length of the bottom stabilizing arm. It is the difference in length of the top and bottom stabilizing arms and the difference between pivot points between the top and bottom stabilizing arms first ends, at the stationary posts, and the distance between pivot points between the top and bottom stabilizing arms second ends at the lifting arms, which causes the lifting and tipping support frame 6 to be progressively raised and tipped out and away from the starting generally upright position.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 4 is a side elevation of the container dumping apparatus 1 lifting and tipping assembly 5 showing the reverse view from FIG. 3 demonstrating, in addition to that depicted in FIG. 3 the second lift frame pivot 152.

FIG. 5 is a side elevation of the container dumping apparatus 1 lifting and tipping assembly 5 showing the reverse view from FIG. 2 demonstrating, in addition to that depicted in FIG. 2 the first lift frame pivot 142.

FIG. 8 depicts a gondola 220 with lift bearing rods 222 and a first dump gondola pivot 182.

FIG. 9 is a detail A from FIG. 8 depicts a gondola 220 with lift bearing rods 222 and a first dump gondola pivot 182.

FIG. 9A is a reverse from FIG. 9 of the gondola 220 with lift bearing rods 222 and a second dump gondola pivot 192.

FIGS. 10, 11, 12, 13, 14, 15 and 16 illustrate the sequence of movements of the elements and the gondola during operation of the invention. Demonstrated in FIG. 10 through 14 is the sequence of positions of the invention as the first and second lift actuators 140, 150 go from unactuated to fully actuated with the first and second lift pistons 144, 154 going from fully retracted to fully extended. Shown in FIGS. 15 and 16 is the sequence of positions of the invention as the first and second dump actuators 180, 190 go from unactuated to fully actuated with the first and second dump pistons 184, 194 going from fully retracted to fully extended. Illustrated is progression of positions of the first lifting arm 10 from generally upright in FIG. 10 to tipped out from the apparatus in FIG. 14 and 15 as the first and second lift pistons 144, 154 extend. Shown is the lifting and dumping of the gondola as the first and second dump pistons 184, 194 are extended.

DETAILED DESCRIPTION

Figure 1:
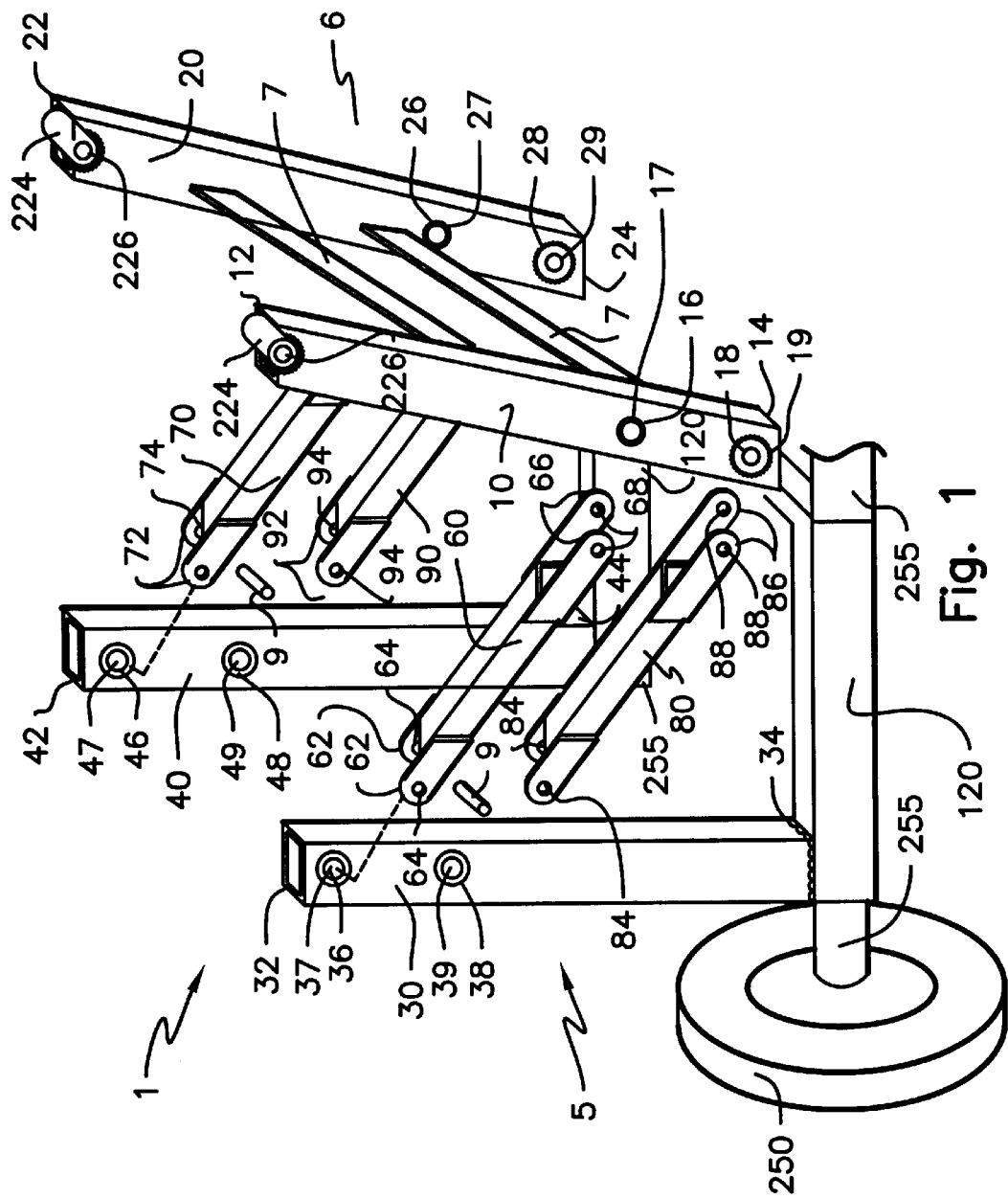
FIG. 1 is an exploded view of the invention showing the lifting and tipping assembly 5 showing a lifting and tipping support frame 6 having cross support members 7. Also shown are the first and second lifting arms 10, 20, first and second lifting arm tops 12, 22; first and second lifting arm bottoms 14, 24; first and second top stabilizing arm journals 16, 26; first and second bottom stabilizing arm journals 18, 28; first and second top stabilizing arm journal apertures 17, 27; and first and second bottom stabilizing arm journal apertures 19, 29. Also illustrated are first and second stationary post 30, 40 having first and second stationary post tops 32, 42 and first and second stationary post bottoms 34, 44; first and second top stabilizing arm journals 36, 46 and first and second bottom stabilizing arm journals 38, 48. Illustrated are the distance between top and bottom stabilizing arm journal d1 and d2 distance between top and bottom stabilizing arm journal at the first and secondary posts 30, 40 and the first and secondary lifting arms 10, 20. Also seen are the first and second top stabilizing arms 60, 70, first and second top stabilizing arm first ends 62, 72; first and second top stabilizing arm first apertures 64, 74; first and second top stabilizing arm second ends 66, 76 and first and second top stabilizing arm second apertures 68, 78. Shown are the first and second bottom stabilizing arms 80, 90 having first and second bottom stabilizing arm first ends 82, 92; first and second bottom stabilizing arm first apertures 84, 94; first and second bottom stabilizing arm second ends 86, 96 and first and second bottom stabilizing arm second apertures 88, 98. Illustrated is the length of first and second top stabilizing arms L1 and length of first and second bottom stabilizing arms L2. Seen is the container dump frame 120 with wheel means as wheels 250 and axles 255. Shown are first and second stationary posts, 30, 40 are affixed at first and second post bottoms 34, 44 by means to the container dump frame 120. The first and second top stabilizing arm first apertures 64, 74 are pivotally received by connection means, including rods 9', by first and second top stabilizing arm journals 36, 46. The first and second top stabilizing arm second apertures 66, 76 are pivotally received by connection means, including rods 9', by first and second top stabilizing arm journals 16, 26. The first and second bottom stabilizing arm first apertures 84, 94 are pivotally received by connection means, including rods 9', by first and second bottom stabilizing arm journals 38, 48. The first and second bottom stabilizing arm second apertures 88, 98 are pivotally received by connection means, including rods 9', by first and second bottom stabilizing arm journals 18, 28. Seen are gondola journals 224, at the first and second lifting arm tops 12, 22, having gondola journal apertures 226.
Figure 2:
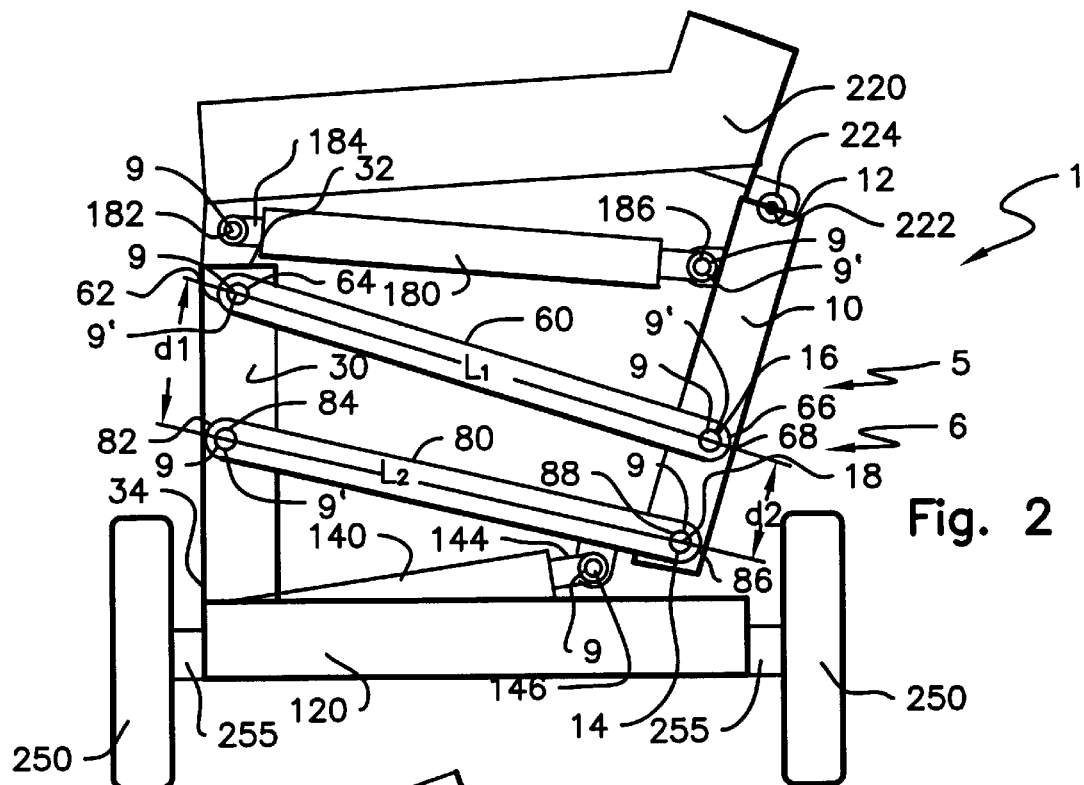
FIG. 2 is a side elevation of the container dumping apparatus 1 lifting and tipping assembly 5 showing the first lifting arm 10 with first lifting arm top 12; first lifting arm bottom 14; first top stabilizing arm journal 16; first bottom stabilizing arm journal 18; first top stabilizing arm journal aperture 17; and first bottom stabilizing arm journal aperture 19. Also seen is the first stationary post 30 having first stationary post top 32 and first stationary post bottom 34; first top stabilizing arm journal 36 and first bottom stabilizing arm journal 38. Illustrated are the distance between top and bottom stabilizing arm journal d1 and d2 distance between top and bottom stabilizing arm journal at the stationary and lifting posts respectively. Also seen is the first top stabilizing arm 60 with first top stabilizing arm first end 62; first top stabilizing arm first aperture 64; first top stabilizing arm second end 66 and first top stabilizing arm second aperture 68. Illustrated is the length of top stabilizing arm L1 and length of bottom stabilizing arm L2. Also seen is the first bottom stabilizing arm 80 having first bottom stabilizing arm first end 82; first bottom stabilizing arm first aperture 84; first bottom stabilizing arm second end 86 and first bottom stabilizing arm second aperture 88. Also demonstrated is the first lift actuator 140 showing the first lift piston pivot 146 and first lift piston 144; the first dump actuator 180 is seen with first dump gondola pivot 182, first dump piston 184 and first dump piston pivot 186. Seen is the container dump frame 120, wheel 250 and axle means 255. Illustrated as the means of interconnection between journals and apertures is a journal rod or pin 9. Shown is a container configured as a gondola 220 with gondola journal 226 and lift bearing rod 222.
Figure 3:
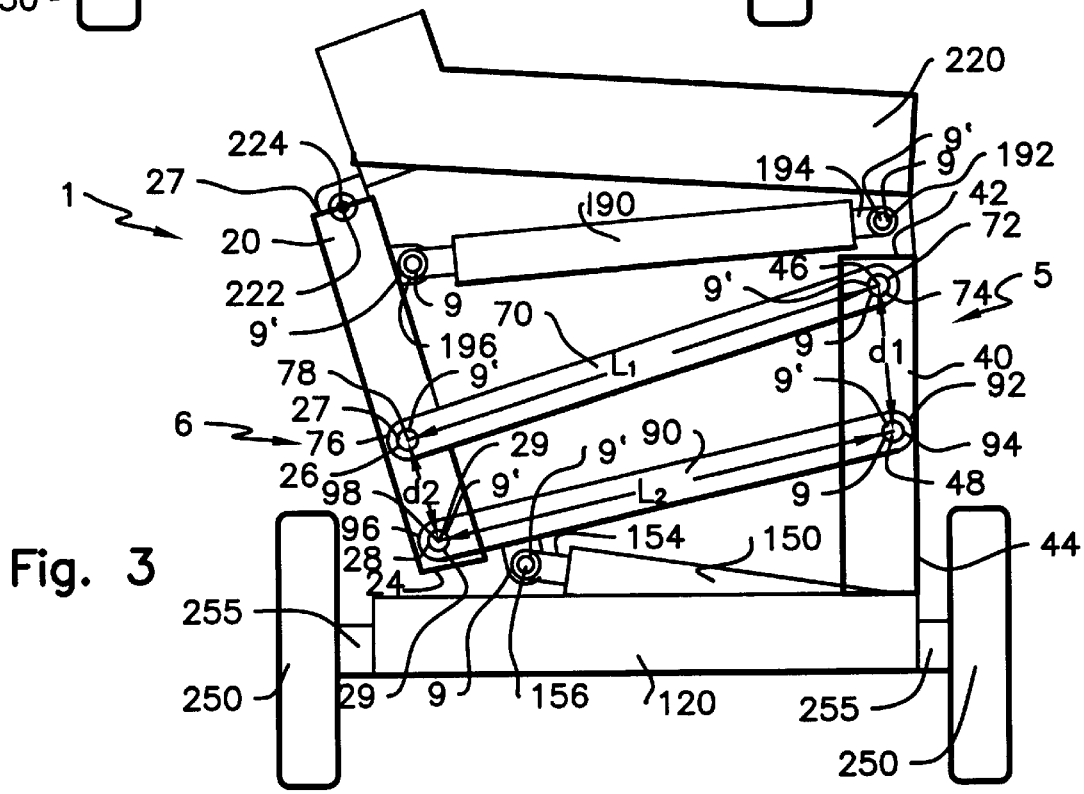
FIG. 3 is a side elevation of the container dumping apparatus 1 lifting and tipping assembly 5 showing the second lifting arm 20 with second lifting arm top 22; second lifting arm bottom 24; second top stabilizing arm journal 26; second bottom stabilizing arm journal 28; second top stabilizing arm journal aperture 27; and second bottom stabilizing arm journal aperture 29. Also seen is the second stationary post 40 having second stationary post top 42 and second stationary post bottom 44; second top stabilizing arm journal 46 and second bottom stabilizing arm journal 48. Illustrated are the distance between top and bottom stabilizing arm journal d1 and d2 distance between top and bottom stabilizing arm journal at the stationary and lifting posts respectively. Also seen is the second top stabilizing arm 70 with second top stabilizing arm first end 72; second top stabilizing arm first aperture 74; second top stabilizing arm second end 76 and second top stabilizing arm second aperture 78. Illustrated is the length of top stabilizing arm L1 and length of bottom stabilizing arm L2. Also seen is the second bottom stabilizing arm 90 having second bottom stabilizing arm first end 92; second bottom stabilizing arm first aperture 94; second bottom stabilizing arm second end 96 and second bottom stabilizing arm second aperture 98. Also demonstrated is the second lift actuator 150 showing the second lift piston pivot 156 and second lift piston 154; seen is the second dump actuator 190 is seen with second dump gondola pivot 192, second dump piston 194 and second dump piston pivot 196. Seen is the container dump frame 120, wheel 250 and axle means 255. Illustrated as the means of interconnection between journals and apertures is a journal rod or pin 9. Shown is a container configured as a gondola 220 with gondola journal 226 and lift bearing rod 222.

The Container Dumping Apparatus 1 is shown in FIG. 1 through 6 and 10 through 16. FIG. 1 through 5 are views showing the lifting and tipping assembly 5 which includes a lifting and tipping support frame 6 having cross support members 7. Also shown are the first and second lifting arms 10, 20, with attendant first and second lifting arm tops 12, 22; first and second lifting arm bottoms 14, 24; first and second top stabilizing arm journals 16, 26; first and second bottom stabilizing arm journals 18, 28; first and second top stabilizing arm journal apertures 17, 27; and first and second bottom stabilizing arm journal apertures 19, 29. The first and second lifting arms 10, 20 are seen to comprise members of the lifting and tipping support frame 6 which members are rigidly affixed by means generally of bolting or welding or equivalent means.

Also illustrated, as elements of the lifting and tipping assembly 5, are first and second stationary post 30, 40 having first and second stationary post tops 32, 42 and first and second stationary post bottoms 34, 44; first and second top stabilizing arm journals 36, 46 and first and second bottom stabilizing arm journals 38, 48. Illustrated are the distance between top and bottom stabilizing arm journal d1 and d2 distance between top and bottom stabilizing arm journal at the stationary post and the lifting arm respectively.

Also seen are the first and second top stabilizing arms 60, 70 with first and second top stabilizing arm first ends 62, 72; first and second top stabilizing arm first apertures 64, 74; first and second top stabilizing arm second ends 66, 76 and first and second top stabilizing arm second apertures 68, 78. Illustrated is the length of top stabilizing arm L1 and length of bottom stabilizing arm L2.

Also seen are the first and second bottom stabilizing arms 80, 90 having first and second bottom stabilizing arm first ends 82, 92; first and second bottom stabilizing arm first apertures 84, 94; first and second bottom stabilizing arm second ends 86, 96 and first and second bottom stabilizing arm second apertures 88, 98. Seen is the container dump frame 120 with wheel means affixed by axle means shown in the preferred embodiment as wheels 250 and axles 255. The first and second stationary posts, 30, 40 are affixed at first and second post bottoms 34, 44 by means, including but not limited to welding, bolting and other means, to the container dump frame 120. Journals will generally be secured by welding means but may be secured by other methods recognized in the mechanical arts.

It is seen that the first and second lifting arms 10, 20 and lifting and tipping support frame 6 are movably interconnected with first and second stationary posts 30, 40 by means including, as illustrated here but not therein limited, apertures and journals receiving pin or rod 9' connection means. Illustrated as the means of interconnection between journals and apertures is a journal rod or pin 9. The first and second top stabilizing arm first apertures 64, 74 are pivotally received by connection means, including rods 9', by first and second top stabilizing arm journals 36, 46. The first and second top stabilizing arm second apertures 66, 76 are pivotally received by connection means, including rods 9', by first and second top stabilizing arm journals 16, 26. The first and second bottom stabilizing arm first apertures 84, 94 are pivotally received by connection means, including rods 9', by first and second bottom stabilizing arm journals 38, 48. The first and second bottom stabilizing arm second apertures 88, 98 are pivotally received by connection means, including rods 9', by first and second bottom stabilizing arm journals 18, 28.

A container, depicted herein as a gondola 220, is secured to the lifting and tipping support frame 6 at gondola journals 226, having gondola journal apertures 226 which receive lift bearing rods 222, affixed by means at first and second lifting arm tops 12, 22. Said lift bearing rods 222 are affixed by means including welding at the gondola 220. The combination of gondola journals 226 and lift bearing rods 222 providing a pivotal interconnection between the gondola 220 and the lifting and tipping support frame 6.

Lifting and tipping operations in the preferred embodiment are provided by lifting and dumping actuator means provided here by hydraulic means. Demonstrated for lifting forces are the first and second lift actuators 140, 150 showing the first and second lift piston pivots 146, 156 where interconnection occurs with first and second lift pistons 144, 154 and first and second lift frame pivots 142, 152 where interconnection occurs with said first and second lift actuators 140, 150 and the container dump frame 120. The operations of the first and second lift actuators 140, 150 create movement and lifting forces to lift and tip the gondola 220. Dumping of the gondola 220 is accomplished by operation of first and second dump actuators 180, 190 whose first and second dump pistons 184, 194 are pivotally interconnected with the gondola 220 at first and second dump gondola pivots 182, 192 wherein pivot means is affixed to the gondola 220 and interconnection means utilized to pivotally affix the first and second dump pistons 184, 194. The first and second dump actuators 180, 190 are affixed to the first and second lifting arms 10, 20 by means at first and second dump pivots 186, 196. Seen is the container dump frame 120, wheel 250 and axle means 255. Illustrated as the means of interconnection between journals and apertures is a journal rod or pin 9.

Figure 6:
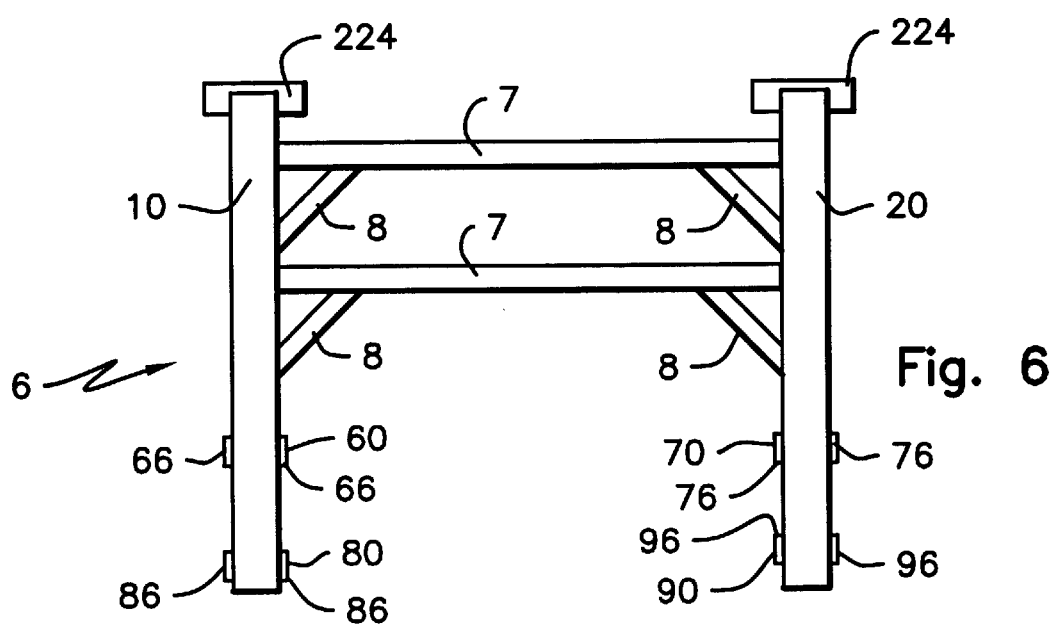
FIG. 6 is a front elevation of the container dumping apparatus 1 showing the lifting and tipping support frame 6 illustrating, in addition to elements depicted in FIG. 1, structural support means depicted as braces 8.

The container dumping apparatus 1 utilized in the agricultural setting will generally be fabricated from sheet metal or mild steel stock or the equivalent depending upon the container loads anticipated. Those of ordinary skill in the mechanical arts will appreciate construction from plastics, composite materials and other materials depending upon the application. Pivoting connections in the preferred embodiment are journals having journal apertures receiving pins or rods and may be formed, as recognized by those of ordinary skill in the mechanical arts, of other bearing and interconnecting devices. Seen for example are gondola journals 224 affixed by means, including welding and other fixing means, at the first and second lifting arm tops 12, 22; the gondola journals 224 having gondola journal apertures 226 to receive lift bearing rods 222 affixed by means to the container or gondola 220. The lifting and tipping support frame 6, illustrated in FIG. 6 shows, in addition to elements depicted in FIG. 1, structural support means depicted as braces 8.

Figure 7:
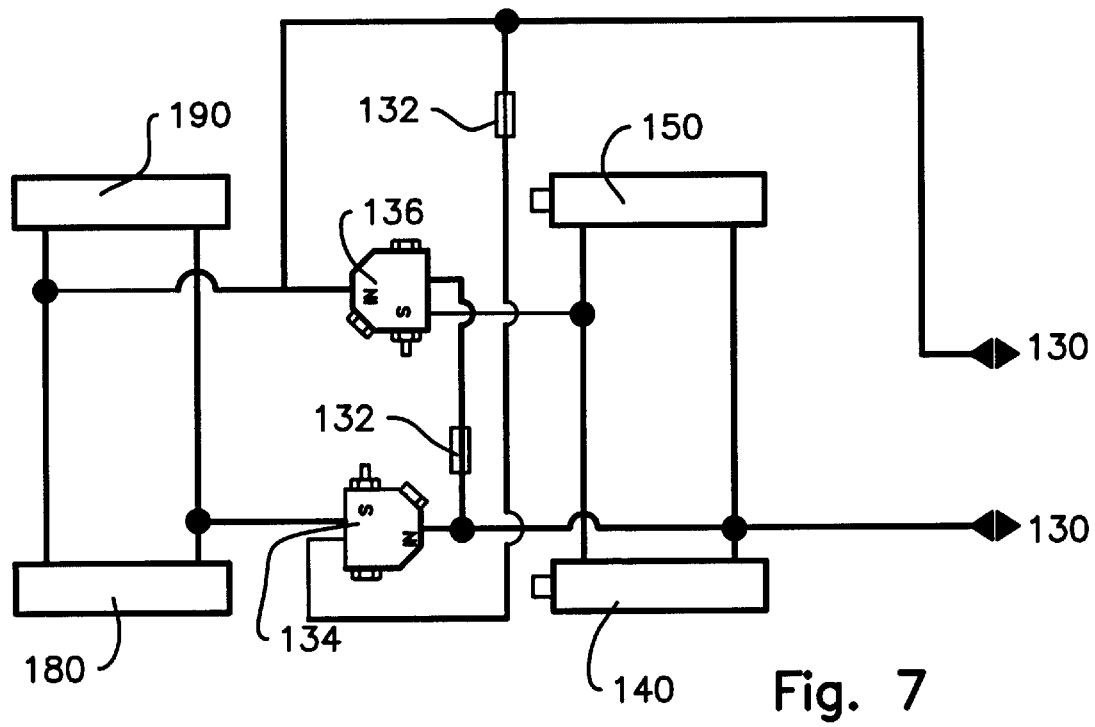
FIG. 7 is a schematic diagram of hydraulics for the operation of the container dumping apparatus 1 showing point of attachment to hydraulic pressure source and reservoir 130, first and second lift actuators 140, 150, first and second dump actuators 180, 190, check valves 132 and first and second sequence valves 134, 136.

A schematic diagram of hydraulics for the operation of the container dumping apparatus 1 shown in FIG. 7 demonstrates schematically the point of attachment to hydraulic pressure source and reservoir 130. Hydraulic switching means, seen in the preferred embodiment as first and second sequence valves 134, 136 may be provided by other devices including for example pneumatic switching devices and, where movement is required by limit switch control of electric motor and gear means. Switching means will, as illustrated by FIG. 7, initially actuate first and second lift actuators 140, 150 to extend first and second lift pistons 144, 154 causing lifting Forces at the first and second lift piston pivots 146, 156 thus moving and raising the lifting and tipping support frame 6 including the first and second lifting arms 10, 20 and first and second top and bottom stabilizing arms 60, 70, 80, 90. Upon reaching the limit of extension of the first and second lift pistons 144, 156 as dictated by pressure settings where the switching is accomplished by pressure switching means or by limit switches, power means including hydraulic pressure, is asserted at the first and second dump actuators 180, 190, causing extension of first and second dump pistons 184, 194 wherein the container, or gondola 220, will be rotated from a tipped position, as seen in FIGS. 10 through 16, to an inverted position for discharge of the container contents. FIG. 7 illustrates check valves 132 recognized by those in the mechanical arts as standard means of operating pressure driven systems.

FIGS. 10, 11, 12, 13, 14, 15 and 16 illustrate the sequence of movements of the elements and the gondola during operation of the invention. The invention illustrated herein is the progressive lifting and tipping of the first and second lifting arms 10, 20 and lifting and tipping support frame 6 and gondola from generally upright to a raised and tipped position out from or away from the invention apparatus.

The invention is the movement of the gondola 220 from an upright position to position displaced from the vertical which is away from the apparatus of the invention and toward a container into which the gondola 220 contents are to be dumped. The tipping out of the first and second lifting arms 10, 20 of the invention is determined by the relationship of lengths of the first and second top stabilizing arms 60, 70, from first to second apertures 64, 66 and 74, 76 relative to the lengths of the first and second bottom stabilizing arms 80, 90 from first to second apertures 84, 86 and 94, 96 and, additionally, the relationship of distance d1 between top and bottom stabilizing arm journals 16, 18 and 26, 28 at the first and second lifting arms 10, 20 in relation to the distance d2 between the between top and bottom stabilizing arm journals 36, 38 and 46, 48 at the stationary posts 30, 40. In the preferred embodiment the length L1 of the first and second top stabilizing arms 60, 70 is greater than the length L2 of the first and second bottom stabilizing arms 80, 90. The lengths of the first and second top stabilizing arms 60, 70 are equal as are the lengths of the first and second bottom stabilizing arms 80, 90. The distance d1 between top and bottom stabilizing arm journals 16, 18 and 26, 28 at the first and second lifting arms 10, 20 is greater than the distance d2 between the between top and bottom stabilizing arm journals 36, 38 and 46, 48 at the stationary posts 30, 40. in the preferred embodiment, when this apparatus is constructed to accommodate a gondola 220 as recognized by one of ordinary skill in grape harvesting, the length L1 is 44.5" and the length L2 is 42.5"; distance d1 is 16" and distance d2 is 14". The first and second stationary posts 30, 40 are 43.5" from post top to post bottom 32, 34 and 42, 44 with the top and bottom stabilizing arm journals 36, 38 and 46, 48 intermediate the post top and bottoms 32, 34 and 42, 44. The bottom stabilizing arm journals 38, 48 positioned 23.5" from the post bottoms 34, 44 intermediate the top stabilizing arm journals 36, 38 and the post bottoms 34, 44. Post bottoms 34, 44 terminate at a container dump frame 120. The first and second lifting arms 10, 20 are 58" from lifting arm top to lifting arm bottom 12, 14 and 22, 24 with the top and bottom stabilizing armjournals 16, 18 and 26, 28 intermediate the lifting arm top and bottoms 12, 22 and 14, 24. The bottom stabilizing arm journals 18, 28 positioned 4" from the lifting arm bottoms 14, 24 intermediate the top stabilizing arm journals 26, 28 and the first and second lifting arm bottom 22, 24.

The length ratio L1/L2 is in the range of 1.25 to 1.01; the ratio of d1/d2 is in the range of 2 to 1.01. In one embodiment the length ratio L1/L2 is 1.04; the ratio of d1/d2 is 1.14. The ratios of L1/L2 and d1/d2 is also addressed from the view of measurement were in an embodiment the length L1 is 44.5" and the length L2 is 42.5"; distance d1 is 16" and distance d2 is 14"; the first and second stationary posts 30, 40 are 43.5" from post top to post bottom 32, 34 and 42, 44 with the top and bottom stabilizing arm journals 36, 38 and 46, 48 intermediate the post top and bottoms 32, 34 and 42, 44; the bottom stabilizing arm journals 38, 48 positioned 23.5" from the post bottoms 34, 44 intermediate the top stabilizing arm journals 36, 38 and the post bottoms 34, 44; post bottoms 34, 44 terminate at a container dump frame 120; the first and second lifting arms 10, 20 are 58" from lifting arm top to lifting arm bottom 12, 14 and 22, 24 with the top and bottom stabilizing arm journals 16, 18 and 26, 28 intermediate the lifting arm top and bottoms 12, 22 and 14, 24; the bottom stabilizing arm journals 18, 28 positioned 4" from the lifting arm bottoms 14, 24 intermediate the top stabilizing arm journals 26, 28 and the first and second lifting arm bottom 22, 24.

In the preferred embodiment the lifting and tipping frame 6, including first and second lifting arms 10, 20 are moved and lifted by first and second lift actuators 140, 150 asserting forces from first and second stationary posts 30, 40 to first and second lift piston pivots 146, 156 at first and second bottom stabilizing arms 80, 90. Alternative embodiments may utilize one or a plurality of lift actuators interconnected by interconnection means between one or a plurality of stationary posts or their equivalent and one or a plurality of lifting arms, or their equivalent, or one or a plurality of pivots at one or a plurality of bottom or top stabilizing arms.

An alternative embodiment will present with L1 less than L2 and d1 less than d2. This embodiment will cause the lifting and tipping support frame to lift and tip over the apparatus in a direction opposed to that of the preferred embodiment.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A Container Dumping Apparatus comprising:

A. a lifting and tipping assembly having a lifting and tipping support frame; the lifting and tipping support frame having first and second lifting arms 10, 20; said first and second lifting arms 10, 20 having first and second lifting arm tops 12, 22 and first and second lifting arm bottoms 14, 24;

B. the lifting and tipping assembly 5 additionally comprised of first and second stationary post 30, 40 having first and second stationary post tops 32, 42 and first and second stationary post bottoms 34, 44; the apparatus having a container dump frame 120; the first and second stationary posts 30, 40 rigidly affixed by fixing means, upright, at the container dump frame 120 at the first and second stationary post bottoms 34, 44, C. first and second top stabilizing arms 60, 70, having lengths L1 between first and second top stabilizing arm first apertures 64, 74 and second apertures 68, 78; first and second bottom stabilizing arms 80, 90, having lengths L2 between first and second bottom stabilizing arm first apertures 84, 94 and second apertures $8, 98, the first and second top stabilizing arm first apertures 64, 74 and second apertures 68, 78 rotatably affixed respectively at the first and second stationary posts 30, 40 intermediate said first and second stationary post tops and bottoms 32, 34 and 42, 44; the first and second bottom stabilizing arm first apertures 84, 94 and second apertures 88, 98 rotatably affixed respectively at the first and second lifting arms 10, 20 intermediate said first and second top stabilizing arm first and second ends 62, 72 and second ends 66, 76 and first and second lifting arm bottoms 14, 24;

D. the length of the first and second top stabilizing alms L1 greater than the length of the first and second bottom stabilizing arms L2; the distance d1, between top and bottom stabilizing arm first apertures 64, 84 and 74, 94 at the first and second stationary posts 30, 40 greater than the distance d2 between top and bottom stabilizing arm second apertures 68, 88 and 78, 98 at the first and second lifting arms 10, 20;

E. a container is secured to the lifting and tipping support frame by rotatable means; the lifting and tipping support frame is lifted by lifting means; the container is rotated by rotating means.

2. A Container Dumping Apparatus of claim 1 further comprising:

A. the lifting and tipping support frame 6 having cross support members 7; the first and second lifting arms 10, 20 and the first and second stationary posts 30, 40 having first and second top stabilizing arm journals 16, 26, and 36, 46, having first and second top stabilizing arm journal apertures 17, 27, and 37, 47, intermediate the first and second lifting arm tops and bottoms 12, 14 and 22, 24 and the first and second stationary post tops and bottoms 32, 34 and 42, 44; the first and second lifting arms 10, 20 and the first and second stationary posts 30, 40 having first and second bottom stabilizing arm journals 18, 26 and 38, 48, having first and second bottom stabilizing arm journal apertures 19, 29 and 39, 49, intermediate the first and second top stabilizing arm journals 16, 26, and 36, 46 and the first and second lifting arm bottoms 14, 24;

B. the first and second lifting arms 10, 20 comprise members of the lifting and tipping support frame 6 which members are rigidly affixed by means; the first and second top stabilizing arm first and second ends 62, 72 and 66, 76 having first and second top stabilizing arm first and second apertures 64, 74 and 68, 78; the first and second bottom stabilizing arm first and second ends 82, 92 and 86, 96 having first and second bottom stabilizing arm first and second apertures 84, 94 and 88, 98;

C. the first and second top stabilizing arm first and second apertures 64, 74 and 68, 78 and the first and second bottom stabilizing arm first and second apertures 84, 94 and 88, 98 received and pivotally affixed by means respectively at first and second top stabilizing arm journal apertures 17, 27, and 37, 47 and by first and second bottom stabilizing arm journal apertures 19, 29 and 39, 49;

D. wheel means affixed by axle means at the container dump frame 120.

3. A Container Dumping Apparatus of claim 2 further comprising:

A. the container is a gondola 220; the gondola 220 is received by the first stationary post and first lifting arm, the lifting and tipping support frame and the second stationary post and second lifting arm; wheel means and axle means are wheels 250 and axles 255;

B. first and second stationary posts, 30, 40 are affixing means is welding to the container dump frame 120; means for affixing journals comprised of welding means;

C. the gondola 220, is secured to the lifting and tipping support frame 6 at gondola journals 226, having gondola journal apertures 226 which receive lift bearing rods 222, affixed by means at first and second lifting arm tops 12, 22; lift bearing rods 222 are affixed by means including welding at the gondola 220; the combination of gondola journals 226 and lift bearing rods 222 providing a pivotal interconnection between the gondola 220 and the lifting and tipping support frame 6; have first and second lift pistons 144, 154; first and second lift piston pivots 146, 156 affixed to assert a lifting force against the lifting and tipping support frame 6 pivotally connect with first and second lift pistons 144, 154; first and second lift frame pivots 142, 152 affixed by means to assert a lifting force against the lifting and tipping support frame 6 pivotally connect with the first and second lift actuators 140, 140; first and second dump actuators 180, 190 have first and second dump pistons 184, 194 pivotally connected with the gondola 220 at first and second dump gondola pivots 182, 192; the first and second dump actuators 180, 190 are pivotally affixed to assert a rotational force against the gondola 220 about the gondola journal 224; switching means will initially actuate first and second lift actuators 140, 150 to extend first and second lift pistons 144, 154 causing lifting forces at the first and second lift piston pivots 146, 156 thus moving and raising the lifting and tipping support frame 6 including the first and second lifting arms 10, 20 and first and second top and bottom stabilizing arms 60, 70, 80, 90; switching means, upon reaching the limit of extension of the first and second lift pistons 144, 156, actuates the first and second dump actuators 180, 190, causing extension of first and second dump pistons 184, 194 wherein the gondola 220, will be rotated from a lifted position to an inverted position for discharge of the container contents.

4. A Container Dumping Apparatus of claim 3 further comprising:

A. said first and second lift and dump actuators are hydraulic and said switching means are pressure switches; the apparatus is constructed from steel stock; first and second lift piston pivots 146, 156 affixed at the first and second bottom stabilizing arms 80, 90 proximal the first and second bottom stabilizing arm second ends 86, 97 pivotally connect with first and second lift pistons 144, 154; first and second lift frame pivots 142, 152 affixed by means to the first and second dump actuators 180, 190 are pivotally affixed to the first and second lifting arms 10, 20 intermediate the proximal the first and second lifting arm tops 12, 22 and the first and second top stabilizing arm journals 16, 26.

5. A Container Dumping Apparatus of claim 3 further comprising:

A. said first and second lift and dump actuators are pneumatic and said switching means are pressure switches; the apparatus is constructed from steel stock.

6. A Container Dumping Apparatus of claim 3 further comprising:

A. said lifting and rotating means are comprised of electric motors and gear means; the apparatus is constructed from steel stock.

7. A Container Dumping Apparatus comprising:

A. a lifting and tipping assembly having a lifting and tipping support frame; the lifting and tipping support frame having one or a plurality of lifting arms having lifting arm tops and bottoms;

B. the lifting and tipping assembly 5 additionally comprised of one or a plurality of stationary post having stationary post tops and bottoms; the apparatus having a container dump frame 120; the one or a plurality of stationary posts rigidly affixed by fixing means, upright, at the container dump frame 120 at the one or a plurality of stationary post bottoms;

C. one or a plurality of top stabilizing arms having lengths L1 between top stabilizing arm first apertures and second apertures; one or a plurality of bottom stabilizing arms having lengths L2 between bottom stabilizing arm first apertures and second apertures; the one or a plurality of top stabilizing arm first apertures and second apertures rotatably affixed respectively at the one or a plurality of stationary posts intermediate said one or a plurality of stationary post tops and bottoms; the one or a plurality of bottom stabilizing arm first apertures and second apertures rotatably affixed respectively at the one or a plurality of lifting arms intermediate said one or a plurality of top stabilizing arm first ends and second ends and the one or a plurality of lifting arm bottoms;

D. the length of the one or a plurality of top stabilizing arms L1 greater than the length of the one or a plurality of second bottom stabilizing arms L2; the distance d1 between the one or a plurality of top and bottom stabilizing arm first apertures at the one or a plurality of stationary posts greater than the distance d2 between the one or a plurality of top and bottom stabilizing arm second apertures at the one or a plurality of lifting arms;

E. a container is secured to the lifting and tipping support frame by rotatable means; the lifting and tipping support frame is lifted by lifting means; the container is rotated by rotating means.

8. A Container Dumping Apparatus of claim 7 further comprising:

A. the lifting and tipping support frame 6 having cross support members 7; the one or a plurality of lifting arms and the one or a plurality of stationary posts having one or a plurality of top stabilizing arm journals, having top stabilizing arm journal apertures, intermediate the one or a plurality of lifting arm tops and bottoms and the one or a plurality of stationary post tops and bottoms; the one or a plurality of lifting arms and the one or a plurality of stationary posts having one or a plurality of bottom stabilizing arm journals, having bottom stabilizing arm journal apertures, intermediate the one or a plurality of top stabilizing arm journals and the one or a plurality of lifting arm bottoms;

B. the one or a plurality of lifting arms comprise members of the lifting and tipping support frame 6 which members are rigidly affixed by means; the one or a plurality of top stabilizing arm first and second ends having top stabilizing arm first and second apertures; the one or a plurality of bottom stabilizing arm first and second ends having bottom stabilizing arm first and second apertures;

C. the top stabilizing arm first and second apertures and the bottom stabilizing arm first and second apertures received and pivotally affixed by means respectively at top stabilizing arm journal apertures and by bottom stabilizing arm journal apertures;

D. wheel means affixed by axle means at the container dump frame 120.

9. A Container Dumping Apparatus of claim 8 further comprising:

A. the container is a gondola 220; the gondola 220 is received by the one or a plurality of stationary posts and one or a plurality of lifting arms and the lifting and tipping support frame; said wheel means and axle means are wheels 250 and axles 255;

B. the one or a plurality of stationary posts affixing means is welding to the container dump frame 120; means for affixing journals comprised of welding means, C. the gondola 220, is secured to the lifting and tipping support frame 6 at gondola journals 226, having gondola journal apertures 226 which receive lift bearing rods 222, affixed by means at the one or a plurality of lifting arm tops; lift bearing mods 222 are affixed by means including welding at the gondola 220; the combination of gondola journals 226 and lift bearing rods 222 providing a pivotal interconnection between the gondola 220 and the lifting and tipping support frame 6;

D. said lifting and rotating means are comprised of one or a plurality of lift actuators have one or a plurality of lift pistons; one or a plurality of lift piston pivots affixed at the one or a plurality of bottom stabilizing arms proximal the one or a plurality of bottom stabilizing arm second ends pivotally connect with one or a plurality of lift pistons; one or a plurality of lift frame pivots affixed by means to the container dump frame 120 pivotally connect with the one or a plurality of lift actuators; one or a plurality of dump actuators have one or a plurality of dump pistons pivotally connected with the gondola 220 at one or a plurality of dump gondola pivots; the one or a plurality of dump actuators are pivotally affixed to the one or a plurality of lifting arms intermediate and proximal the one or a plurality of lifting arm tops and the one or a plurality of top stabilizing arm journals; switching means will initially actuate the one or a plurality of lift actuators 140, 150 to extend one or a plurality lift pistons 144, 154 causing lifting forces at the one or a plurality lift piston pivots 146, 156 thus moving and raising the lifting and tipping support frame 6 including the one or a plurality lifting arm 10, 20 and one or a plurality top and bottom stabilizing arms 60, 70, 80, 90; said switching means, upon reaching the limit of extension of the one or a plurality lift pistons 144, 156, actuates the one or a plurality dump actuators 180, 190, causing extension of one or a plurality dump pistons 184, 194 wherein the gondola 220, will be rotated from a lifted position to an inverted position for discharge of the container contents.

10. A Container Dumping Apparatus of claim 9 further comprising:

A. the one or a plurality of lift and dump actuators are hydraulic and said switching means are pressure switches, the apparatus is constructed from steel stock.

11. A Container Dumping Apparatus of claim 9 further comprising:

A. the one or a plurality of lift and dump actuators are pneumatic and said switching means are pressure switches; the apparatus is constructed from steel stock.

12. A Container Dumping Apparatus of claim 9 further comprising:

A. said lifting and rotating means are comprised of electric motors and gear means; the apparatus is constructed from steel stock.

13. A Container Dumping Apparatus of claim 3 further comprising:

A. the length ratio L1/L2 is in the range of 1.25 to 1.01; the ratio of d1/d2 is in the range of 2 to 1.01.

14. A Container Dumping Apparatus of claim 13 further comprising:
   A. the length ratio L1/L2 is 1.047; the ratio of d1/d2 is 1.14.

15. A Container Dumping Apparatus of claim 14 further comprising;
   A. the length L1 is 44.5" and the length L2 is 42.5"; distance d1 is 16" and distance d2 is 1.4"; the first and second stationary posts 30, 40 are 43.5" from post top to post bottom 32, 34 and 42, 44 with the top and bottom stabilizing arm journals 36, 38 and 46, 48 intermediate the post top and bottoms 32, 34 and 42, 44; the bottom stabilizing arm journals 38, 48 positioned 23.5" from the post bottoms 34, 44 intermediate the top stabilizing arm journals 36, 38 and the post bottoms 34, 44; post bottoms 34, 44 terminate at a container dump frame 120; the first and second lifting arms 10, 20 are 58" from lifting arm top to lifting arm bottom 12, 14 and 22, 24 with the top and bottom stabilizing arm journals 16, 18 and 26, 28 intermediate the lifting arm top and bottoms 12, 22 and 14, 24; the bottom stabilizing arm journals 18, 28 positioned 4" from the lifting arm bottoms 14, 24 intermediate the top stabilizing arm journals 26, 28 and the first and second lifting arm bottom 22, 24.

16. A Container Dumping Apparatus of claim 9 further comprising:
   A. the length ratio L1/L2 is in the range of 1.25 to 1.01; the ratio of d1/d2 is in the range of 2 to 1.01.

17. A Container Dumping Apparatus of claim 16 further comprising:
   A. the length ratio L1/L2 is 1.047; the ratio of d1/d2 is 1.14.

18. A Container Dumping Apparatus of claim 17 further comprising:
   A. the length L1 is 44.5" and the length L2 is 42.5"; distance d1 is 16" and distance d2 is 14"; the one or a plurality of stationary posts are 43.5" from post top to post bottom with the one or a plurality of top and bottom stabilizing arm journals intermediate the one or a plurality of post lop and bottoms; the one or a plurality of bottom stabilizing arm journals positioned 23.5" from the one or a plurality of post bottoms intermediate the one or a plurality of top stabilizing arm journals and the one or a plurality of post bottoms; the one or a plurality of post bottoms terminate at a container dump frame 120; the one or a plurality of lifting arms 10, 20 are 58" from one or a plurality lifting arm top to lifting arm bottom with the one or a plurality top and bottom stabilizing arm journals intermediate the one or a plurality Of lifting arm top and bottoms; the one or a plurality of bottom stabilizing arm journals positioned 4" from the one or a plurality of lifting arm bottoms intermediate the one or a plurality of top stabilizing arm journals and the one or a plurality of lifting arm bottom.

19. A Container Dumping Apparatus comprising:
   A. a lifting and tipping assembly having a lifting and tipping support frame: the lifting and tipping support frame having first and second lifting arm 10, 20, said first and second lifting arms 10, 20 having first and second lifting arm tops 12, 22 and first and second lifting arms bottoms 14, 24;
   B. the lifting and tipping assembly 5 additionally comprised of first and second stationary post 30, 40 having first and second stationary post tops 32, 42 and first and second stationary post bottoms 34, 44; the apparatus having a container dump frame 120; the first and second stationary posts 30, 40 rigidly affixed by fixing means, upright, at the container dump frame 120 at the first and second stationary post bottoms 34, 44;
   C. first and second top stabilizing arms 60, 70, having lengths L1 between first and second top stabilizing arm first apertures 64, 74 and second apertures 68, 78; first and second bottom stabilizing arms 80, 90, having lengths L2, having first and second bottom stabilizing arm first apertures 84, 94 and second apertures 88, 98; the first and second top stabilizing arm first apertures 64, 74 and second apertures 68, 78 rotatably affixed respectively at the first and second stationary posts 30, 40 intermediate said first and second stationary post tops and bottoms 32, 34 and 42, 44; the first and second bottom stabilizing arm first apertures 84, 94 and second apertures 88, 98 rotatably affixed respectively at the first and second lifting arms 10, 20 intermediate said first and second top stabilizing arm first and second ends 62, 72 and second ends 66, 76 and first and second lifting arm bottoms 14, 24;
   D. the length of the first and second top stabilizing arms L1 less than the length of the first and second bottom stabilizing arms L2; the distance d1 between top and bottom stabilizing arm first apertures 64, 84 and 74, 94 at the first and second stationary posts 30, 40 less than the distance d2 between top and bottom stabilizing arm second apertures 68, 88 and 78, 98 at the first and second lifting arms 10, 20,
   E. a container is secured to the lifting and tipping support frame by rotatable means; the lifting and tipping support frame is lifted by lifting means; the container is rotated by rotating means.

* * * * *